US010291643B2

(12) United States Patent
Marquez et al.

(10) Patent No.: US 10,291,643 B2
(45) Date of Patent: May 14, 2019

(54) METHOD AND SYSTEM FOR VALIDATING A VULNERABILITY SUBMITTED BY A TESTER IN A CROWDSOURCING ENVIRONMENT

(71) Applicant: Praetorian Group, Inc., Austin, TX (US)

(72) Inventors: Antonio Rene Marquez, Austin, TX (US); Sergio Romulo Salazar, South Pasadena, CA (US); Nathan Sportsman, Austin, TX (US)

(73) Assignee: Praetorian Group, Inc., Austin, TX (US)

( * ) Notice: Subject to any disclaimer, the term of this patent is extended or adjusted under 35 U.S.C. 154(b) by 321 days.

(21) Appl. No.: 15/381,045

(22) Filed: Dec. 15, 2016

(65) Prior Publication Data

US 2018/0034846 A1    Feb. 1, 2018

Related U.S. Application Data

(60) Provisional application No. 62/368,767, filed on Jul. 29, 2016.

(51) Int. Cl.
  *H04L 29/06*  (2006.01)
(52) U.S. Cl.
  CPC .............................. *H04L 63/1433* (2013.01)

(58) Field of Classification Search
  CPC .................................................. H04L 63/1433
  See application file for complete search history.

(56) References Cited

U.S. PATENT DOCUMENTS

| | | | | |
|---|---|---|---|---|
| 7,594,270 | B2 * | 9/2009 | Church | G06F 21/552 |
| | | | | 726/23 |
| 9,177,156 | B1 * | 11/2015 | Kaplan | H04L 63/1433 |
| 9,413,780 | B1 * | 8/2016 | Kaplan | H04L 63/1433 |
| 9,824,222 | B1 * | 11/2017 | Kaplan | G06F 21/577 |
| 10,142,204 | B2 * | 11/2018 | Nickolov | H04L 43/0817 |
| 2013/0074188 | A1 * | 3/2013 | Giakouminakis | G06F 21/57 |
| | | | | 726/25 |
| 2017/0213037 | A1 * | 7/2017 | Toledano | G06F 21/552 |
| 2017/0300698 | A1 * | 10/2017 | Chawla | G06F 21/577 |

\* cited by examiner

*Primary Examiner* — Khang Do
(74) *Attorney, Agent, or Firm* — Ziegler IP Law Group, LLC

(57) ABSTRACT

A method for validating a vulnerability submitted by a tester in a crowdsourcing environment. The method comprises identifying at least one vulnerability within at least one computer resource and receiving vulnerability data corresponding to the at least one vulnerability. The method further comprises pre-processing the vulnerability data to generate structured data and generating a replica of the vulnerability using the structured data and at least one validator. Further, the method comprises calculating a confidence score of the vulnerability using the replica of the vulnerability and a result of the at least one validator. The method executes at least one validating instruction based on the confidence score of the vulnerability.

17 Claims, 9 Drawing Sheets

600

| ? | Login or Register |
| Register | Login | Logged in as: Not Logged in | Clear All | Check For Updates |

? Choose Your Bounty
Program: [　　　　　　　　] }— 602

? Bug Details
Vulnerability: [　　　　　▼]  Comment: [　]
Payload: [　　　　　　]
                         604
Requests:

| # | Method | URL | Params |

? Submit Bug
[Not Connected] [View Results] }— 606

FIG. 6

METHOD AND SYSTEM FOR VALIDATING A VULNERABILITY SUBMITTED BY A TESTER IN A CROWDSOURCING ENVIRONMENT

TECHNICAL FIELD

The present disclosure relates generally to vulnerability validity systems; and more specifically, to methods and systems for validating a vulnerability submitted by a tester in a crowdsourcing environment.

BACKGROUND

An Internet revolution has brought with it a new vehicle for property vandalism, financial theft, and corporate espionage on a scale unparalleled in human history. Organizations have placed significant attention towards Internet-based threats by installing security programs for uncovering and remediating vulnerabilities within the organization's infrastructure. A popular practice for identifying unknown risk and evaluating security posture is to simulate a real-world attack against the organization's infrastructure. This simulated attack is often referred to as a penetration test. Normally, a third party service provider is hired wherein the organization and the third party both agree that the third party will evaluate the security posture for a finite time and the organization will pay the third party a pre-negotiated set amount for the third party's effort without regard to third party's value creation. The value in this context is defined by a number and a severity of unknown vulnerabilities discovered.

However, a constant change in the organization's infrastructure, an unending release of new compromise techniques, and an unwavering number of intrusion attempts all warrant the need for a security assessment model that provides continuous and unending risk identification and remediation. Moreover, the cost of engaging the third party to perform the penetration testing on a continuous basis discourages this level of coverage.

In a prior art solution, a crowdsourcing based vulnerability detection system is used where a freelance workforce is used to receive continuous and ongoing vulnerability identification for the organization. Additionally, the crowdsourcing based vulnerability detection system charges a fee for service only after value, by way of a valid vulnerability submission, has been provided to the organization. However, in this solution, a signal-to-noise ratio of valid to invalid vulnerability submissions substantially increases due to a freelance workforce strategy of "spray and pray". Using this strategy, a majority of the freelance workforce ignores program scope guidelines, deprioritizes the quality of their work, incorporates limited reproduction instructions, and provides low value submissions. While the organization is not required to pay for these submissions, the process of reviewing such submissions consumes the time and energy of the organization. Further, the signal-to-noise ratio is exacerbated by a fact that the crowdsourcing based vulnerability detection system were not designed with automation in mind. Instead and in one embodiment, a state of the art crowdsourcing based vulnerability detection system rely primarily on human intervention during a vulnerability triage process for validation submission identification and award. This triage effort is either performed by the organization itself or by the crowdsourcing company for an additional fee. Taken in concert, the triage and management process substantially increases the total cost of vulnerabilities detection for the organization.

In another embodiment, a state of the art crowdsourcing based vulnerability detection system addresses the signal-to-noise problem by either defining a business model that only supports vetted testers or by moving away from an open bug bounty project to a private and invite only, bug bounty project. However, such solutions defeat one of the two core promises of the crowdsourcing model—namely leveraging the law of large numbers by engaging a freelance community of testers to provide continuous coverage to participating organizations.

In addition, a US Patent Publication No. 2012/0239459 discloses crowdsourced competitions where a reward is given to a contestant who generates the highest quality product for a clearly defined set of objectives. Top Coder is another example of this type of competition. Organizations create competitions that request developers to create software products that meet certain functionality requirements. The developers submit their piece of code and a winner is chosen from the set of submissions. However, the existing solution does not leverage the crowd to identify an undefined number of vulnerabilities.

A US Patent Publication No. 2014/0173737 discloses a bug tracking application that takes vulnerability data provided by third parties, such as NIST (National Institute of Standards and Technology), and automatically generates issues to be tracked by developers. Each issue has a corresponding severity score to assist an organization in identifying those items that need to be addressed immediately. The vulnerability data processed by the application represents vulnerabilities that have already been identified and validated. However, the existing solution fails to assist organizations in identifying new vulnerabilities.

A U.S. Pat. No. 8,813,235 discloses use of vulnerability scanners to identify initial weaknesses in an application. Following the use of an automated scanner, the tester will attempt to manually identify additional vulnerabilities. However, the exiting solution fails to automatically validate the vulnerabilities as submitted by the testers.

A U.S. Pat. No. 8,499,353 discloses a process to improve code analysis, by integrating the results of both static and dynamic analysis. This is an automated process, similar to vulnerability scanners, that attempt to both identify and validate the existence of vulnerabilities. Organizations, including third-party security firms, will use code analysers to identify initial weaknesses in application code. Following the use of a code analyser, the testers will attempt to manually identify additional vulnerabilities. However, the existing solution fails to automatically validate the vulnerabilities as identified by the testers.

A U.S. Pat. No. 8,607,353 discloses a process for automating the detection of a security breach through pattern analysis. Security breaches are often a result of a malicious user exploiting a vulnerability in application software, resulting in unwanted application behaviour or the exposure of sensitive information. However, the existing solution does not disclose identification and validating of vulnerabilities as submitted by the testers.

A U.S. Pat. No. 9,178,903 discloses computer systems and methods which are configured to test the security of a server computer by simulating a wide range of attacks from one or more bot-nets which are a network of numerous computers distributed over a range of geographic regions. However, the patent requires a simulated environment of bot-nets and fails to disclose automatic validation of submissions made by consultant testers.

A U.S. Pat. No. 9,177,156 discloses "validating a report of the candidate security vulnerability of the particular system under test that is received from the particular researcher computer." However, the solution corroborates the assertion that human intervention is leveraged at this critical stage and an internal "team" is performing manual validation of vulnerability submissions.

Therefore, in light of the foregoing discussion, there exists a need to provide a method and system for automatically validating the vulnerability submissions in the crowdsourcing environment.

SUMMARY

The present disclosure seeks to provide a method for validating a vulnerability submitted by a tester in a crowdsourcing environment.

The present disclosure also seeks to provide a system for validating a vulnerability submitted by a tester in a crowdsourcing environment.

A method for validating a vulnerability submitted by a tester in a crowdsourcing environment, the method comprising:
  identifying at least one vulnerability within at least one computer resource;
  receiving vulnerability data corresponding to the at least one vulnerability;
  pre-processing the vulnerability data to generate structured data;
  generating a replica of the vulnerability using the structured data and at least one validator;
  calculating a confidence score of the vulnerability using the replica of the vulnerability and a result of the at least one validator; and
  executing at least one validating instruction based on the confidence score of the vulnerability.

A system for validating a vulnerability submitted by a tester in a crowdsourcing environment, the system comprising:
  a testing computer adapted to identify at least one vulnerability within at least one computer resource and submit vulnerability data corresponding to the at least one vulnerability to a server; and
  the server adapted to include:
    a pre-processing module adapted to pre-process the vulnerability data to generate structured data;
    a replica engine adapted to generate a replica of the vulnerability using the structured data and at least one validator;
    a score calculating module adapted to calculate a confidence score of the vulnerability using the replica of the vulnerability and a result of the at least one validator; and
    a validating module adapted to execute at least one validating instruction based on the confidence score of the vulnerability.

Embodiments of the present disclosure substantially eliminate or at least partially address the aforementioned problems in the prior art, and transforms the vulnerability data from a plurality of testers into a structured format such that the vulnerability data can be automatically parsed, interpreted, triaged, and validated with a high degree of verification fidelity.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those skilled in the art will understand that the drawings are not to scale. Wherever possible, like elements have been indicated by identical numbers.

Embodiments of the present disclosure will now be described, by way of example only, with reference to the following diagrams wherein:

FIG. 6 is a schematic illustration of a user interface for receiving vulnerability data corresponding to the at least one vulnerability in accordance with an embodiment of the present disclosure.

Figure 1:
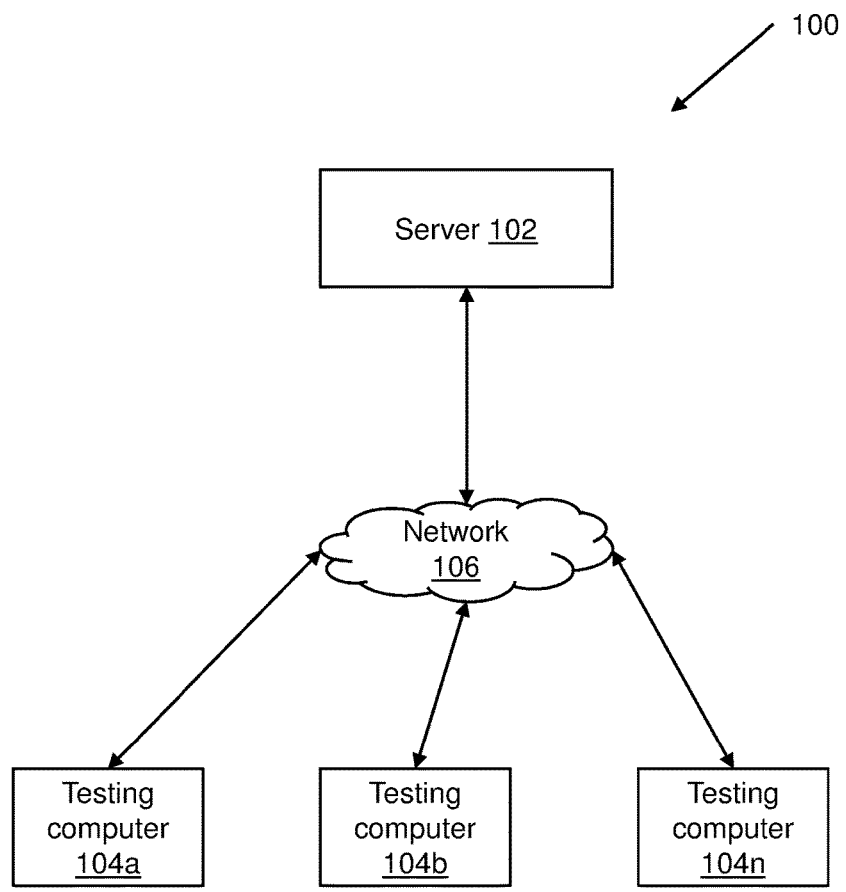
FIG. 1 is a schematic illustration of a system for validating a vulnerability in a crowdsourcing environment in accordance with an embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

In an aspect, an embodiment of the present disclosure provides a method for validating a vulnerability submitted by a tester in a crowdsourcing environment, the method comprising:

identifying at least one vulnerability within at least one computer resource;

receiving vulnerability data corresponding to the at least one vulnerability;

pre-processing the vulnerability data to generate structured data;

generating a replica of the vulnerability using the structured data and at least one validator;

calculating a confidence score of the vulnerability using the replica of the vulnerability and a result of the at least one validator; and executing at least one validating instruction based on the confidence score of the vulnerability.

In another aspect, an embodiment of the present disclosure provides a system for validating a vulnerability submitted by a tester in a crowdsourcing environment, the system comprising:

a testing computer adapted to identify at least one vulnerability within at least one computer resource and submit vulnerability data corresponding to the at least one vulnerability to a server; and the server adapted to include:
a pre-processing module adapted to pre-process the vulnerability data to generate structured data;
a replica engine adapted to generate a replica of the vulnerability using the structured data and at least one validator;
a score calculating module adapted to calculate a confidence score of the vulnerability using the replica of the vulnerability and a result of the at least one validator; and
a validating module adapted to execute at least one validating instruction based on the confidence score of the vulnerability.

In an embodiment, the structured data can include, but is not limited to, the parameterization of an internet protocol, a hostname, an IP address, a port, a service, a uniform resource locator (URI), a parameter, a http method, a vulnerability type, a section of code, and among other information.

In an embodiment, the system enables a plurality of testers to work for an organization which is interested in assessment of one or more computing resources in an agreed business model in a crowdsourcing environment. In an embodiment, the computing resources can include a software program, a module or a computing code, a computer network, and a computer system essential for organization business. The assessment of the one or more computing resources can include identification of vulnerabilities within the computing resources wherein the vulnerabilities can cause threat to organization's digital infrastructure. Further, the system enables an automatic validation of the vulnerabilities received from the testers.

In an embodiment, the system enables the organization to define a scope of a bug bounty project and submits the bug bounty project in the crowdsourcing environment. The scope of the project may include instructions or information for the testers on conducting one or more tests on the computing resources in order to identify vulnerabilities therein. In an embodiment, the bug bounty project can be an open project or a closed project. In the open type bug bounty project, any tester registered with the crowdsourcing environment can participate in the bug bounty project in order to identify and submit the vulnerabilities within the computing resources. In the closed type bug bounty project, the system enables the organization to invite selected testers to identify and submit vulnerabilities within the computing resources.

The tester uses a testing computer which is adapted to perform one or more tests in order to identify the vulnerabilities within the computing resources. In an embodiment, the tester submits the vulnerability using a vulnerability submission plugin. The vulnerability submission plugin is integrated within a tool which the tester may use to perform test operations on the computing resources. The plugin is a piece of software that extends the functionality of another tool. In an embodiment, the plugin enhances a security tool's ability to submit vulnerabilities for validation from a testers local and preferred working environment.

In another embodiment, the tester submits the vulnerability using an upload function. In an embodiment, the upload function is made available to the tester through a web application interface which the tester uses to upload vulnerability data.

The vulnerabilities thus identified can be any issue or security lapse within the computing resource which can pose a threat to an organization's infrastructure. Upon identification of the vulnerability within the computing resource, the testing computer is adapted to communicate with the server regarding submission of the vulnerability data through a network.

In an embodiment, the network can be a wired, wireless, or a combination thereof. Examples of such network includes, but are not limited to, Local Area Networks (LANs), Wide Area Networks (WANs), Metropolitan Area Networks (MANs), Wireless LANs (WLANs), Wireless WANs (WWANs), Wireless MANs (WMANs), the Internet, second generation (2G) telecommunication networks, third generation (3G) telecommunication networks, fourth generation (4G) telecommunication networks, and Worldwide Interoperability for Microwave Access (WiMAX) networks.

The server can be a computing device configured to process one or more instructions to validate the vulnerabilities received from the testing computer. The server includes a pre-processing module, a scope checking module, a signature module, a replica engine, a score calculating module, and a validating module.

The pre-processing module is adapted to pre-process the vulnerability data to generate structured data from the vulnerability submission. In an embodiment, the vulnerability data is restructured for machine consumption to provide automated search, analysis, and decision tree capabilities.

The scope checking module is adapted to extract information from the structured data, determine a scope of the vulnerability using the extracting information and notify the tester when the scope of the vulnerability is outside the scope of the bug bounty project. For example, the scope checking module is adapted to determine from the structured data whether the vulnerability submission of the tester is within the scope of the bug bounty project. The server is adapted to continue processing of the vulnerability when the scope of the vulnerability is within the scope of the bug bounty project. Otherwise, the server is adapted to reject the vulnerability submission of the tester and subsequently, notify the tester regarding rejection of the vulnerability submission. In addition, the organization owning the bug bounty project may be notified that the vulnerability submission of the tester has been rejected.

The replica engine is adapted to generate a replica of the vulnerability using the structured data and at least one validator. The validator is a software usually executed within an isolated environment, that verifies an existence of a specific type of application vulnerability. A validator takes the structured data and return a structured result to indicate if it was able to successfully verify the vulnerability.

Further the server is adapted to include an execution module for automatically generating the replica of the vulnerability in accordance with at least one executable plan. The generation of replica of the vulnerability includes replaying the vulnerability using the structured data. In an embodiment, the server is adapted to employ an independent, isolated, and self-contained systems using proprietary validators and open source tools in order to automatically replicate the vulnerability submitted by the tester. As a result, an ability of the server to replicate discovery and verification of vulnerabilities in parallel with an increased accuracy is substantially increased.

Further, the server is adapted to send the vulnerability to a manual triage queue when the server fails to generate the replica of the vulnerability. In an embodiment, the server is adapted to send the vulnerability to a manual triage queue when the server fails to identify the at least one executable plan for generating the replica of the vulnerability.

The signature module is adapted to generate a signature for the vulnerability using the structured data, compare the signature for the vulnerability with a signature of at least one pre-stored vulnerability submission and notify the tester when the signature for the vulnerability is matched with the signature of the at least one pre-stored vulnerability submission. In an embodiment, the signature thus generated can include information related to a tester unique identifier (for example, a client id), a vulnerability unique identifier (for example, a vulnerability id), a type of the vulnerability (for example, a cross-site scripting, SQL injection, and the like), details of the host (for example, domain.com), request response methods (for example, POST, GET and the like), one or more parameters used in exploiting the vulnerability, and location related information such as Request URL/Header/Body.

The server is adapted to utilize an output of the signature module to determine duplicity of the vulnerability submission of the tester with respect to the pre-stored vulnerability submissions. In an embodiment, a vulnerability submission signature is generated by using the parameterized values of the structured data as inputs to create a hash value output. For example, the server is adapted to declare the vulnerability submission of the tester a duplicate vulnerability when the signatures are matched with pre stored vulnerability submissions. Subsequently, the server is adapted to notify the tester. In an embodiment, the server is adapted to provide a reference of the at least one pre-stored vulnerability submission to the tester when the signature for the vulnerability is matched with the signature of the at least one pre-stored vulnerability submission. Further, when the signature of the vulnerability submission of the tester does not match with the signature of the pre-stored vulnerability submission, the server is adapted to notify the tester that the vulnerability submission is being reviewed. In addition, the organization owning the bug bounty project may be notified so that the organization may determine a final pay-out for a successful submission.

The score calculating module is adapted to calculate a confidence score of the vulnerability using the replica of the vulnerability and a result of the at least one validator. In an embodiment, the score calculating module is adapted to include an orchestrator which is a software for processing a specified vulnerability type by a pool of validators. The vulnerability type can include, but is not limited to, a cross-site scripting attack, a structured query language (SQL) injection, a cross site request forgery (CRSF), click jacking, weaknesses in secure socket layer (SSL)/transport layer security (TLS) and among other types of vulnerability.

Based on the type of the vulnerability, the orchestrator is responsible for structuring the pool of validator results, which is represented in a return value that includes an overall result and a confidence score. Consequently, the score calculating module is adapted to aggregate results of each validator in order to determine the confidence score of the vulnerability.

The confidence score can be referred to as a value returned by the orchestrator as an attempt to quantify a certainty in the existence of a vulnerability based upon the combination of validator results. By providing a quantifiable value, decisions can be made by other components of the orchestrator.

The validating module is adapted to execute one or more validating instructions based on the confidence score of the vulnerability. For example, if the confidence score of the vulnerability meets the threshold specified within the scope of the bug bounty project, an automation of processes occur which will include notifying the tester of their submission results and providing a summary of results to the bug bounty project.

In an embodiment, the one or more validating instructions comprise an instruction to approve the vulnerability when the confidence score of the vulnerability is above a threshold confidence score. In an embodiment the server is adapted to recommend a reward for the tester when the confidence score of the vulnerability is above the threshold confidence score. In an embodiment, the server is adapted to send the vulnerability to a manual triage queue when the confidence score of the vulnerability is below the threshold confidence score.

The present disclosure offers several advantages. The present disclosure transforms vulnerability data into a structure that can be pre-processed, filtered, and validated to substantially reduce a signal-to-noise ratio of valid-to-invalid vulnerability submissions. Leveraging the new system, the majority of vulnerability submissions are rejected before ever entering the manual triage queue for final human verification and reward. The present disclosure substantially reduces the signal-to-noise ratio of vulnerability submissions, reduces the total cost of ownership of the bug bounty project, and improves the turnaround time on the reward payment to the testers.

Further, the present disclosure enables the organization to identify and validate the vulnerabilities without the use of an automated scanner. The disclosure enables users to build validators that can perform dynamic and complex tests, while typical vulnerability scanners are limited by their deployment environment.

DETAILED DESCRIPTION OF THE DRAWINGS

Referring now to the drawings, particularly by their reference numbers, FIG. 1 is a schematic illustration of a system 100 for validating a vulnerability in a crowdsourcing environment in accordance with an embodiment of the present disclosure. The system 100 includes a server 102 and a plurality of testing computers such as a testing computer 104a, a testing computer 104b and a testing computer 104n connected to the server 102 over a network 106. Each of the plurality of testing computers 104 belong to respective testers who may involve in a bug bounty project to identify one or more vulnerabilities within one or more computer resources of an organization owning the bug bounty project.

Figure 2:
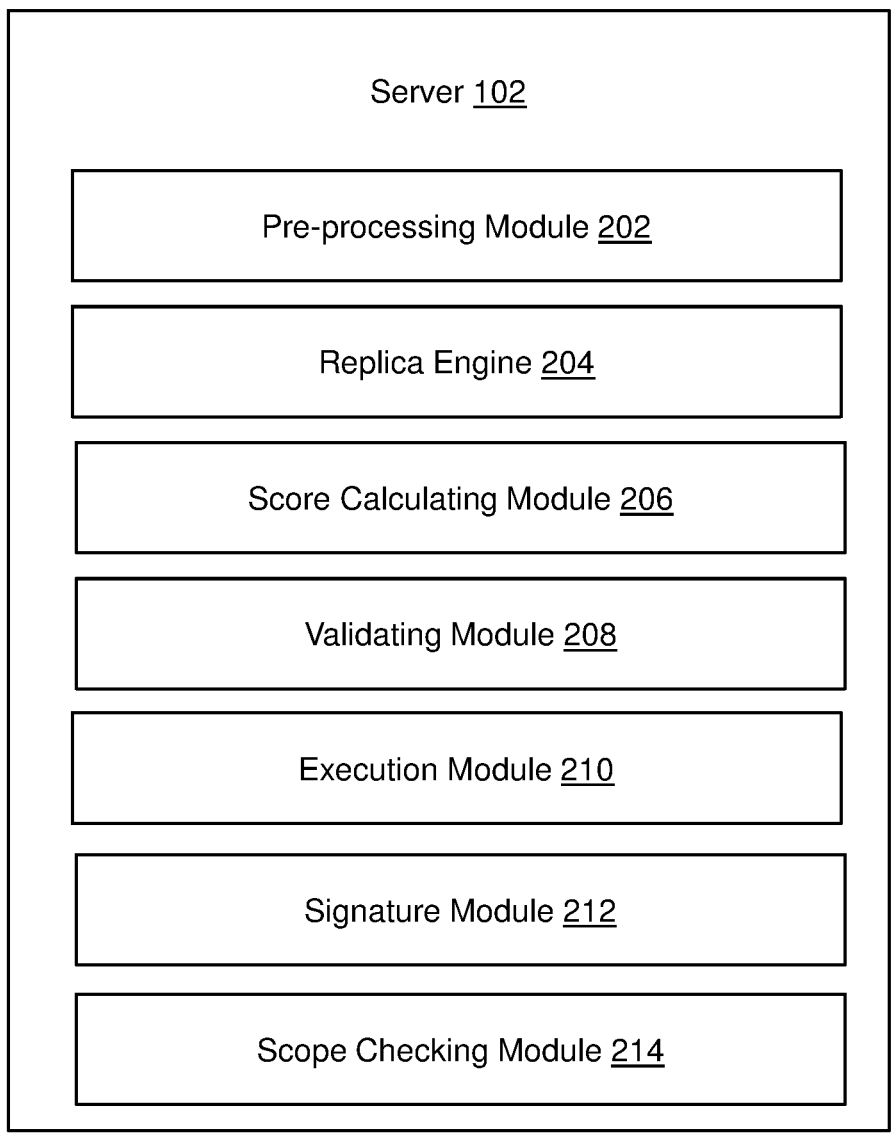
FIG. 2 is a schematic illustration of the server adapted to validate the vulnerabilities within the crowdsourcing environment in accordance with an embodiment of the present disclosure.

FIG. 2 is a schematic illustration of the server 102 adapted to validate the vulnerabilities within the crowdsourcing environment in accordance with an embodiment of the present disclosure. The server 102 is adapted to include a pre-processing module 202, a replica engine 204, a score calculating module 206, and a validating module 208. The pre-processing module 202 is adapted to pre-process the vulnerability data to generate structured data. The replica engine 204 is adapted to generate a replica of the vulnerability using the structured data and at least one validator. The score calculating module 206 is adapted to calculate a confidence score of the vulnerability using the replica of the vulnerability and a result of the at least one validator. The validating module 208 is adapted to execute at least one validating instruction based on the confidence score of the vulnerability. In addition, the server is adapted to include an execution module 210, a signature module 212 and a scope checking module 214.

Figure 3A:
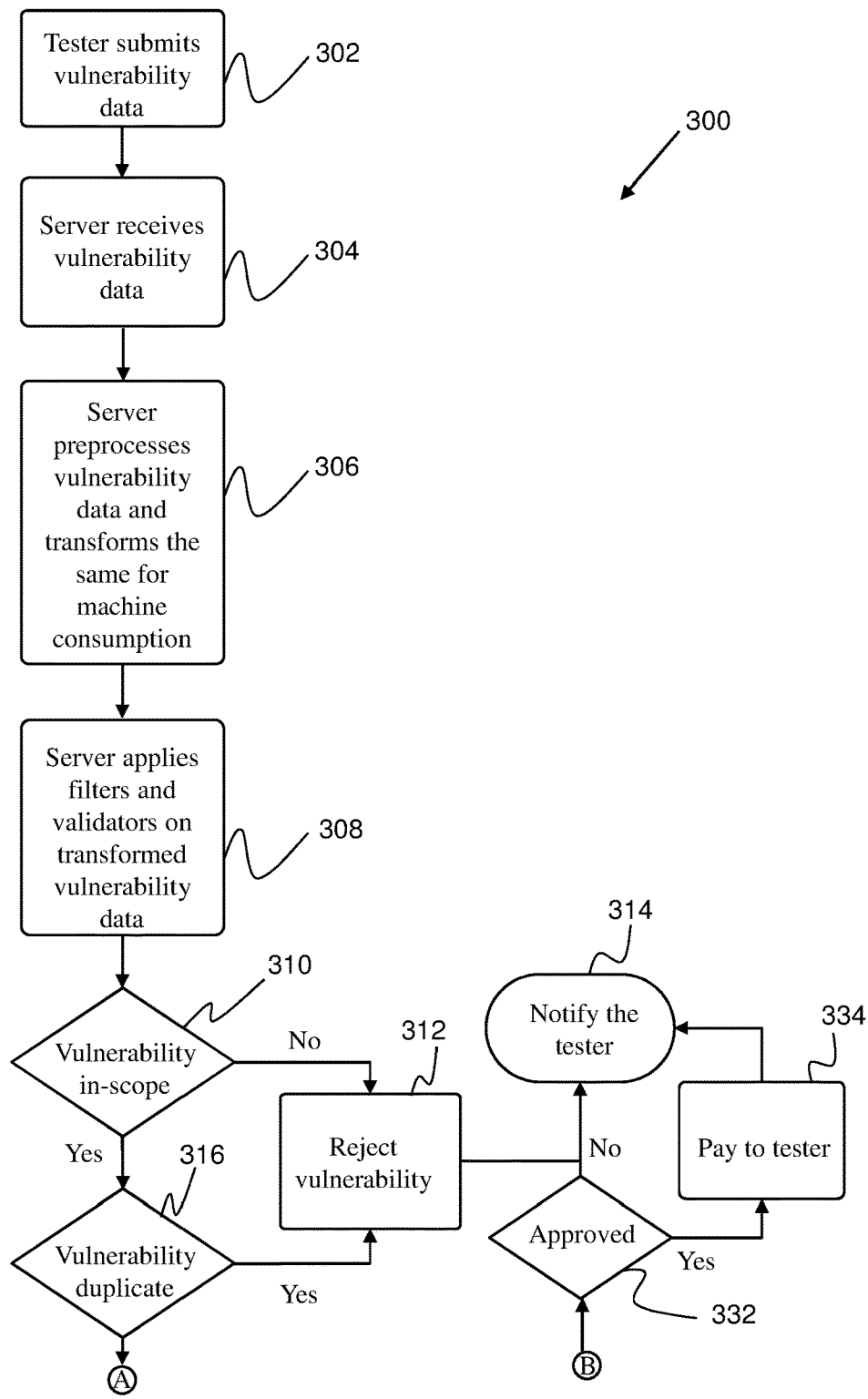
FIGS. 3A-B are schematic illustrations of steps of a method for validating a vulnerability submitted by a tester in a crowdsourcing environment in accordance with an embodiment of the present disclosure.
Figure 3B:
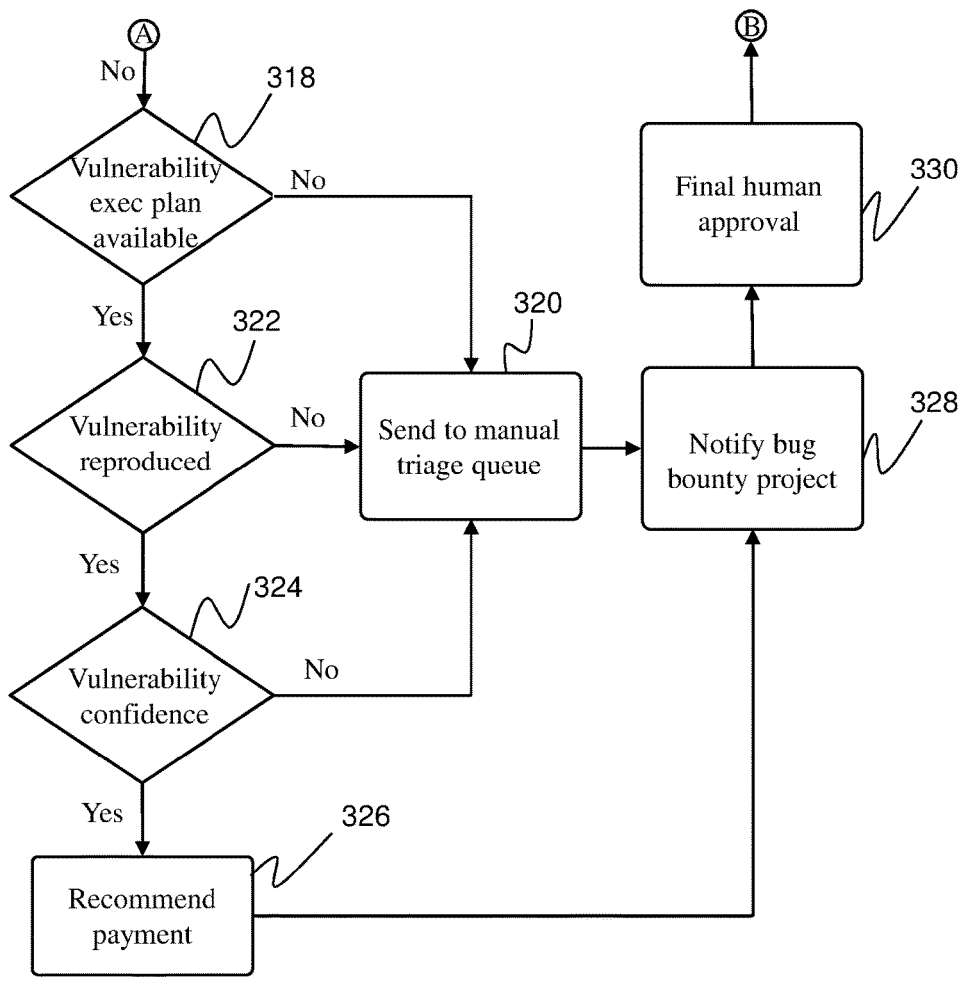

FIGS. 3A-B are schematic illustrations of steps of a method for validating a vulnerability submitted by a tester in a crowdsourcing environment in accordance with an embodiment of the present disclosure. At step 302, a tester submits vulnerability data corresponding to a vulnerability to a server. At step 304, the server receives the vulnerability data. At step 306, the server is adapted to pre-process the vulnerability data and transform the vulnerability data in a manner so that it can be consumed automatically for processing. At step 308, the server is adapted to apply filters and validators on the transformed vulnerability data.

At step 310, a determination is made as to whether the vulnerability submitted by the tester is within a scope of the bug bounty project. The method 300 proceeds to step 312 if it determined that the vulnerability is not within the scope of the bug bounty project. At step 312, the server is adapted to reject the vulnerability as the vulnerability submitted by the tester is not within the scope of the bug bounty project. The method 300 further proceeds to step 314 wherein the server is adapted to notify the tester regarding the rejection of the vulnerability.

The method 300 proceeds to step 316 if it is determined that the vulnerability is within the scope of the bug bounty project. At step 316, the server is adapted to determine whether the vulnerability submitted by the tester is a duplicate vulnerability. The method 300 proceeds to step 312 wherein the vulnerability submission is rejected by the server on determination that the vulnerability is a duplicate vulnerability and thereafter, at step 314 the tester is notified that his vulnerability has been rejected.

The method 300 proceeds to step 318 if it is determined that the vulnerability submitted by the tester is not a duplicate vulnerability. At step 318, a determination is made as to an availability of an executable plan for replicating the vulnerability. The method 300 proceeds to step 320 if the executable plan for replicating the vulnerability is not available. At step 320, the vulnerability is sent to a manual triage queue.

The method 300 proceeds to step 322 if the executable plan for replicating the vulnerability is available. At step 322, a determination is made as to whether the vulnerability is reproduced. The method 300 proceeds to step 320 if the vulnerability is not reproduced. Alternatively, the method 300 proceeds to step 324.

At step 324, a determination is made as to whether a confidence score is assigned to the vulnerability. The method 300 proceeds to step 320 if the confidence score is not assigned to the vulnerability. The method 300 proceeds to step 326 if the confidence score is assigned to vulnerability.

At step 326, the server is adapted to recommend payment to the tester based on the confidence score of the vulnerability. At step 328, the server is adapted to notify the organization owning the bug bounty project. At step 330, a final human approval process is executed for the vulnerability. At step 332, a determination is made as to availability of an approval for the vulnerability. The method 300 proceeds to step 334 if the vulnerability is approved. At step 334, a payment is made to the tester for the vulnerability submission. The method 300 proceeds to step 314 if the vulnerability submission is not approved. As discussed above, at step 314, the result of steps 312, 332 and 334 are notified to the tester.

Figure 4A:
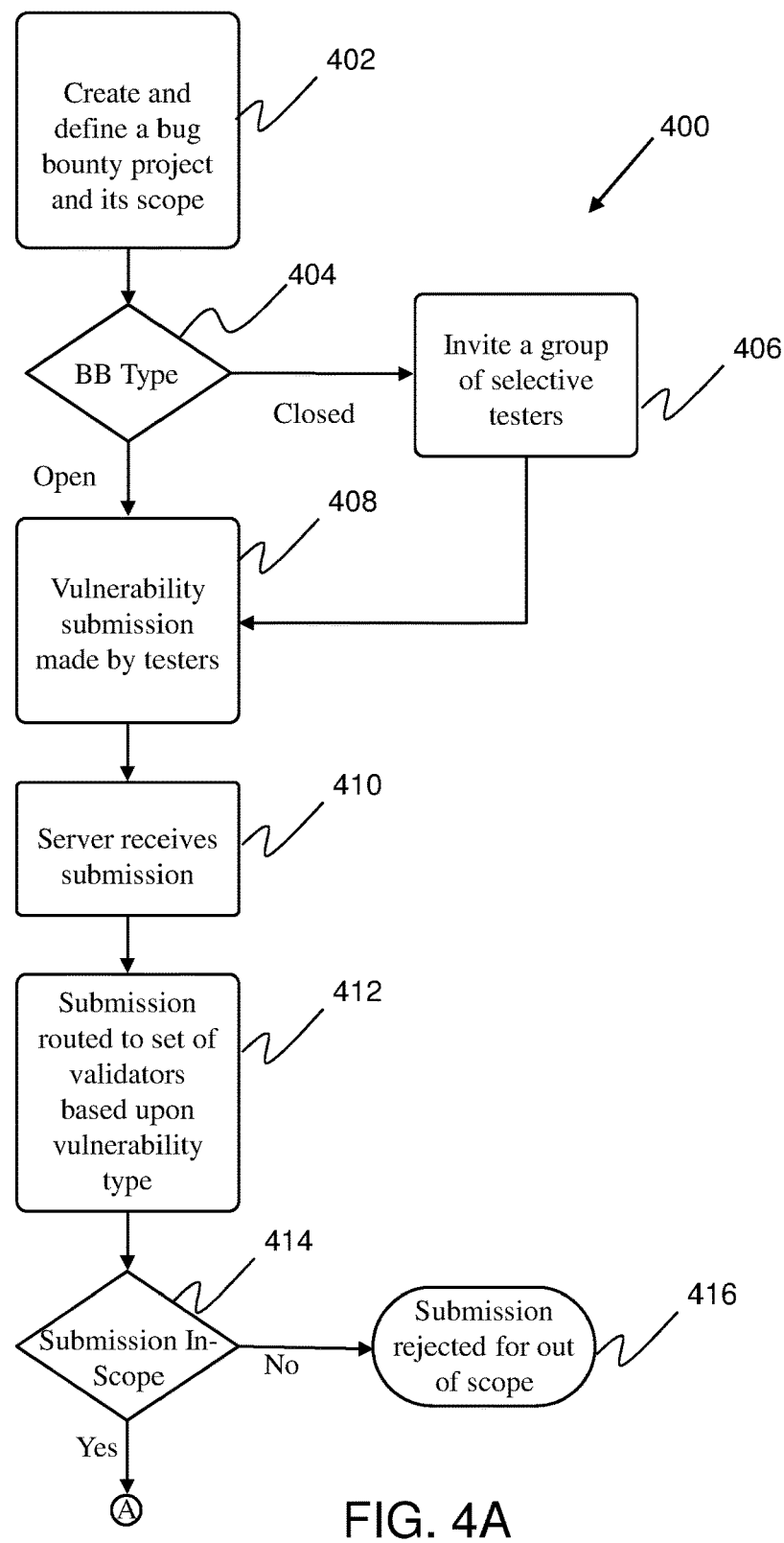
FIGS. 4A-C are schematic illustrations of steps of a method for validating a vulnerability submission and rewarding a tester in accordance with an embodiment of the present disclosure.
Figure 4B:
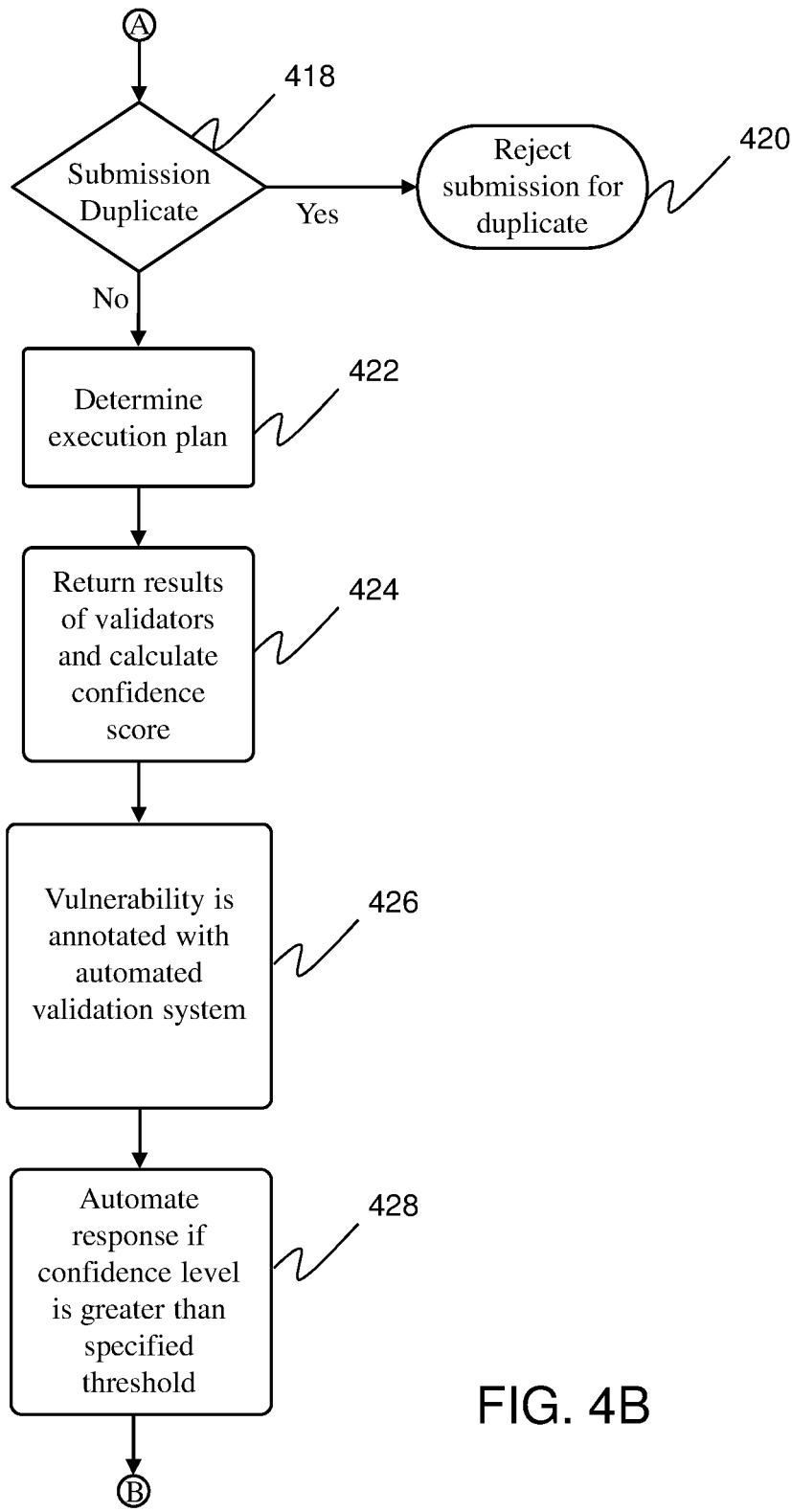
Figure 4C:
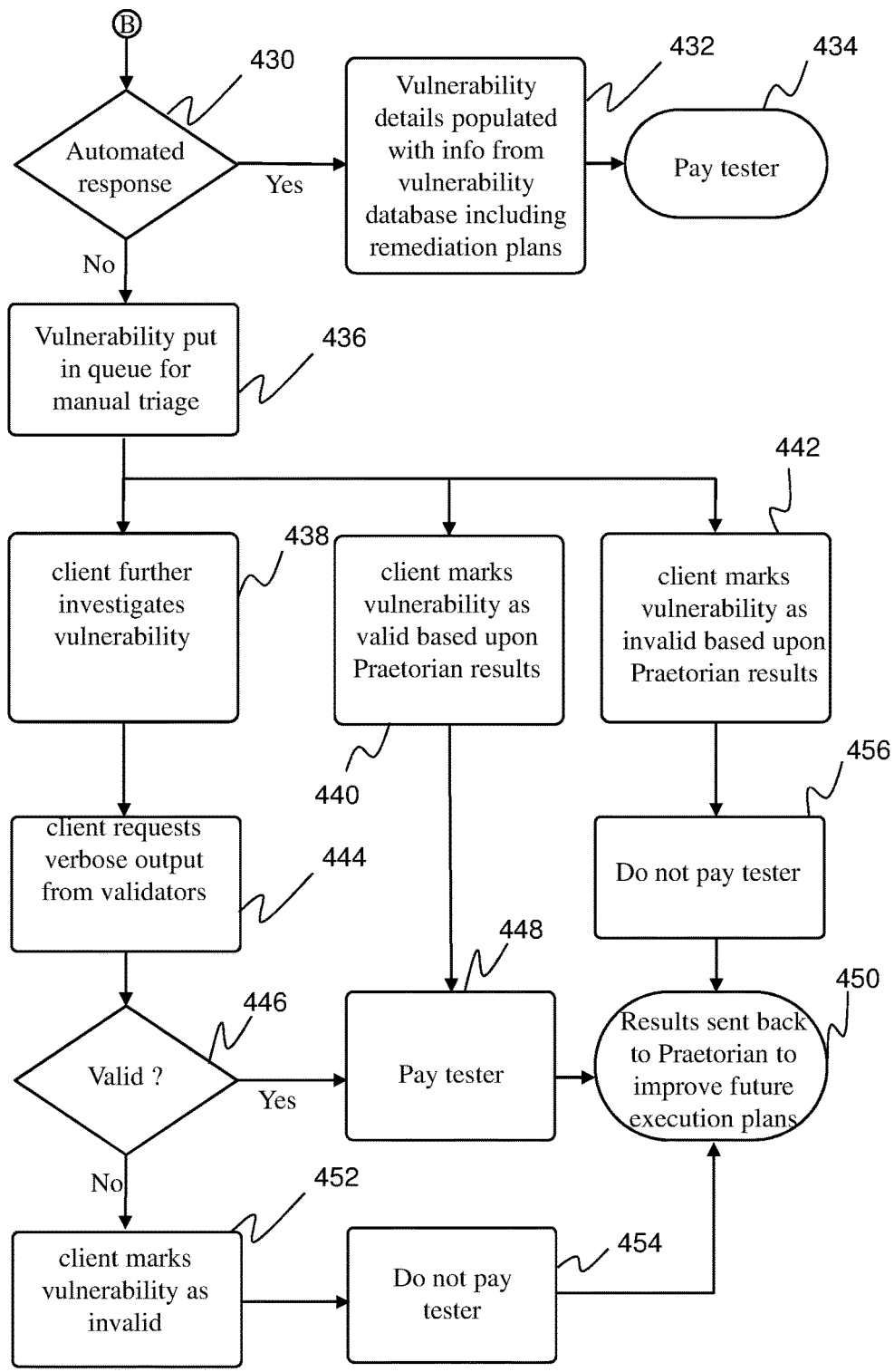

FIGS. 4A-C are schematic illustrations of steps of a method 400 for validating a vulnerability submission and rewarding a tester in accordance with an embodiment of the present disclosure. At step 402, a bug bounty project and its scope is defined for identifying vulnerabilities within computing resources. At step 404, a type of the bug bounty project is determined. The method 400 proceeds to step 406 if it is determined that the type of the bug bounty project is a closed invitation type project. At step 406, a group of selective testers is invited to identify vulnerabilities within the computing resources covering the bug bounty project.

The method 400 proceeds to step 408, if it is determined that the type of the bug bounty project is an open invitation type project. At step 408, the testers (e.g., selective testers or open testers) submit their respective vulnerability submissions. At step 410, a server is adapted to receive the vulnerability submissions. At step 412, the vulnerability submissions are routed to a set of validators based on a type of the vulnerability. At step 414, a determination is made as to whether each of the vulnerability submission is within the scope of the bug bounty project. The method 400 proceeds to step 416 if the vulnerability submission is outside the scope of the bug bounty project. At step 416, the vulnerability submission is rejected for being out of scope of the bug bounty project.

The method 400 proceeds to step 418 if it is determined that the vulnerability submission is within the scope of the bug bounty project. At step 418, a determination is made as to whether the vulnerability submission is a duplicate vulnerability. The method 400 proceeds to step 420 if it is determined that the vulnerability submission is a duplicate vulnerability. At step 420, the vulnerability submission is rejected. The method 400 proceeds to step 422, it the vulnerability submission is not a duplicate vulnerability.

At step 422, an executable plan for replicating the vulnerability submission is determined. At step 424, a replica of the vulnerability submission using structured data and at least one validator is generated and a confidence score of the vulnerability is calculated. At step 426, the vulnerability is annotated with an automated validation system. At step 428, one or more responses are automated when the confidence score of the vulnerability is greater than a threshold confidence score.

At step 430, a determination is made as to availability of an automated response for the vulnerability submission of the tester. The method 400 proceeds to step 432 if it is determined that the automated response is available. At step 432, vulnerability details populated with information from a vulnerability database including remediation plans is selected. At step 434, the tester is paid for his vulnerability submission.

The method 400 proceeds to step 436 if it is determined that the automated response for the vulnerability submission is not available. At step 436, the vulnerability is placed in a queue for manual triage for a client. Based on an output of the manual screening of the queue, the method 400 proceeds to steps 438, 440 and 442 respectively.

At step 438, a client may decide to further investigate the vulnerability submission of the tester. Subsequently, at step 444 the client requests verbose output from validators. At step 446, a manual determination is made as to validity of the vulnerability. The method 400 proceeds to step 448 if the manual determination indicates the validity of the vulnerability. At step 448, the tester is paid for his vulnerability submission. Subsequently, the method 400 proceeds to step 450. The method 400 proceeds to step 452 if the manual determination indicates the vulnerability submission of the tester as an invalid vulnerability submission. At step 452, the client marks the vulnerability submission of the tester as an invalid vulnerability submission. At step 454, the tester is not paid for his invalid vulnerability submission. Subsequently, the method 400 proceeds to step 450.

At step 440, the client marks vulnerability as valid vulnerability based upon praetorian results and the method 400 proceeds to step 448. At step 448, the tester is paid for his vulnerability submission. Subsequently, the method 400 proceeds to step 450.

At step 442, the client marks vulnerability as invalid based upon praetorian results and the method 400 proceeds to step 456. At step 456, the tester is not paid for his vulnerability submission. Subsequently, the method 400 proceeds to step 450.

At step 450, results are sent back to praetorian to improve future execution plans.

Figure 5:
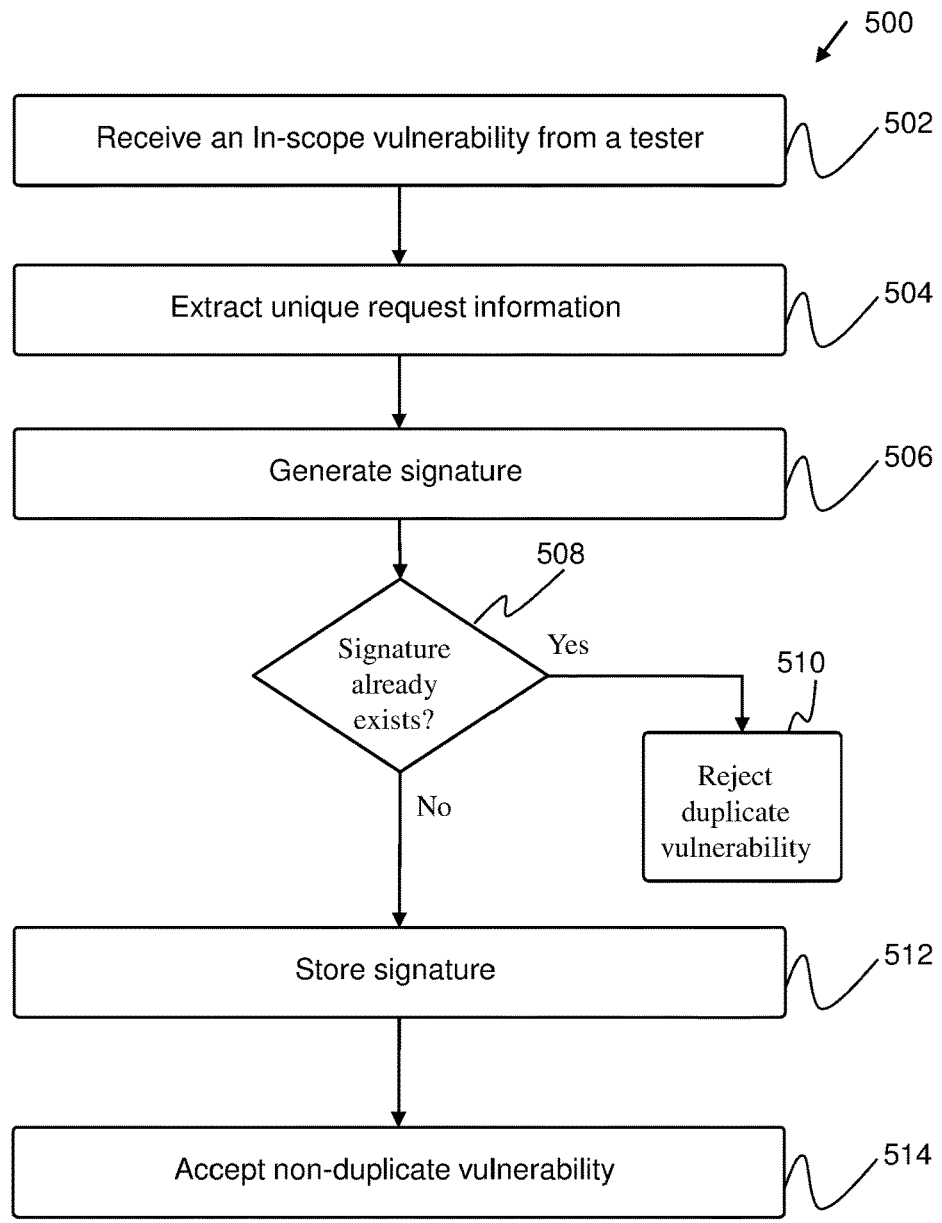
FIG. 5 is a schematic illustration of steps of a method for determining duplicity of a vulnerability submission of a tester in accordance with an embodiment of the present disclosure.

FIG. 5 is a schematic illustration of steps of a method 500 for determining duplicity of a vulnerability submission of a tester in accordance with an embodiment of the present disclosure. At step 502, an in-scope vulnerability submission is received from the tester. At step 504, unique information is extracted from the in-scope vulnerability submission and at step 506, a signature is generated for the vulnerability submission. At step 508, a determination is made as to whether the generated signature exists in a database.

The method 500 proceeds to step 510, if it is determined that the signature exists in the database. At step 510, the vulnerability submission is rejected as the existence of the signature indicates that the tester has already submitted the same vulnerability. The method proceeds to step 512, if it is determined that the signature does not exist in the database. At step 512, the signature is stored in the database for future analysis. At step 514, the method 500 accepts the vulnerability submission as a non-duplicate vulnerability submission.

FIG. 6 illustrates a schematic illustration of a user interface 600 for receiving vulnerability data corresponding to the at least one vulnerability in accordance with an embodiment of the present disclosure. The user interface 600 includes various sections which enable the tester to deliver vulnerability data corresponding to the at least one vulnerability. A section 602 enables the tester to select a client running program. The tester may select the client running program from a drop-down window or enter the name of the client running program. A section 604 enables the tester to provide specific information of the vulnerability. The specific information can include a type of the vulnerability, vulnerability payload, a set of HTTP request representing the vulnerability, and tester's comments regarding the vulnerability. A section 606 includes a submit button enabling the tester to submit the vulnerability data and a view results button for reviewing results of the previous vulnerability submissions.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. A method for validating a vulnerability submitted by a tester in a crowdsourcing environment, the method comprising:
   identifying at least one vulnerability within at least one computer resource;
   receiving vulnerability data corresponding to the at least one vulnerability;
   pre-processing the vulnerability data to generate structured data;
   generating a replica of the vulnerability using the structured data and at least one validator, the at least one validator being configured to verify an existence of a specific type of application vulnerability;
   calculating a confidence score of the vulnerability using the replica of the vulnerability and a result of the at least one validator; and
   executing at least one validating instruction based on the confidence score of the vulnerability, and a threshold confidence score.

2. A method according to claim 1, wherein the at least one validating instruction comprises an instruction to approve the vulnerability when the confidence score of the vulnerability is above the threshold confidence score.

3. A method according to claim 1, further comprising recommending a reward for the tester when the confidence score of the vulnerability is above the threshold confidence score.

4. A method according to claim 1, further comprising sending the vulnerability to a manual triage queue when the confidence score of the vulnerability is below the threshold confidence score.

5. A method according to claim 1, further comprising sending the vulnerability to a manual triage queue when the server fails to generate the replica of the vulnerability.

6. A method according to claim 1, further comprising identifying at least one executable plan for generating the replica of the vulnerability.

7. A method according to claim 6, further comprising sending the vulnerability to the manual triage queue when the server fails to identify the at least one executable plan for generating the replica of the vulnerability.

8. A method according to claim 1, further comprising:
   generating a signature for the vulnerability using the structured data;
   comparing the signature for the vulnerability with a signature of at least one pre-stored vulnerability submission; and
   notifying the tester when the signature for the vulnerability is matched with the signature of the at least one pre-stored vulnerability submission.

9. A method according to claim 8, further comprising providing a reference of the at least one pre-stored vulnerability submission to the tester when the signature for the vulnerability is matched with the signature of the at least one pre-stored vulnerability submission.

10. A method according to claim 1, further comprising:
    extracting information from the structured data;
    determining a scope of the vulnerability using the extracted information; and notifying the tester when the scope of the vulnerability is outside a scope of a bug bounty project.

11. A method according to claim 10, wherein the notifying the tester comprising rejecting the vulnerability when the scope of the vulnerability is outside the scope of a bug bounty project.

12. A method according to claim 1, wherein the structured data include at least parameterization of an internet protocol, a hostname, an IP address, a port, a service, a uniform resource locator (URL), a parameter, a http method, a vulnerability type, and a section of code.

13. A system for validating a vulnerability submitted by a tester in a crowdsourcing environment, the system comprising:
 a testing computer configured to identify at least one vulnerability within the at least one computer resource and submit vulnerability data corresponding to the at least one vulnerability to a server; and
 the server configured to:
 pre-process the vulnerability data to generate structured data;
 generate a replica of the vulnerability using the structured data and at least one validator, the at least one validator being configured to verify an existence of a specific type of application vulnerability;
 calculate a confidence score of the vulnerability using the replica of the vulnerability and a result of the at least one validator; and
 execute at least one validating instruction based on the confidence score of the vulnerability, and a threshold confidence score.

14. A system according to claim 13, wherein the server is configured to automatically generate the replica of the vulnerability in accordance with at least one executable plan.

15. A system according to claim 13, wherein the server is configured to:
 generate a signature for the vulnerability using the structured data;
 compare the signature for the vulnerability with a signature of at least one pre-stored vulnerability submission; and
 notify the tester when the signature for the vulnerability is matched with the signature of the at least one pre-stored vulnerability submission.

16. A system according to claim 13, wherein the server is configured to:
 extract information from the structured data;
 determine a scope of the vulnerability using the extracting information; and
 notify the tester when the scope of the vulnerability is outside a scope of a bug bounty project.

17. A system according to claim 13, wherein the structured data includes at least parameterization of an internet protocol, a hostname, an IP address, a port, a service, a uniform resource locator (URL), a parameter, a http method, a vulnerability type, and a section of code.

* * * * *